United States Patent [19]

Kajiwara et al.

[11] Patent Number: 4,706,871
[45] Date of Patent: Nov. 17, 1987

[54] METHOD OF CONTINUOUSLY HOT-ROLLING STEEL PIECES

[75] Inventors: Toshiyuki Kajiwara; Tomoaki Kimura; Mitsuo Nihei, all of Hitachi, Japan

[73] Assignee: Hitachi, Ltd., Tokyo, Japan

[21] Appl. No.: 639,359

[22] Filed: Aug. 10, 1984

[30] Foreign Application Priority Data

Aug. 12, 1983 [JP] Japan .................. 58-146444

[51] Int. Cl.⁴ .................. B23K 31/02; B23K 13/00
[52] U.S. Cl. .................. 228/158; 228/5.7; 228/26
[58] Field of Search .......... 228/5.7, 26, 158, 189, 228/44.3, 173.7, 176; 72/203

[56] References Cited

U.S. PATENT DOCUMENTS

| 2,214,618 | 9/1940 | Kenyon et al. | 228/158 |
|---|---|---|---|
| 2,533,605 | 12/1950 | Mueller | 228/26 X |
| 3,059,096 | 10/1962 | Butler | 219/101 |
| 3,915,368 | 10/1975 | Ulmer | 228/5.7 X |
| 4,286,744 | 9/1981 | Gullotti et al. | 228/5.7 X |

FOREIGN PATENT DOCUMENTS

| 726541 | 9/1942 | Fed. Rep. of Germany . | |
|---|---|---|---|
| 1003164 | 2/1957 | Fed. Rep. of Germany . | |
| 1056454 | 4/1959 | Fed. Rep. of Germany . | |
| 1095426 | 12/1960 | Fed. Rep. of Germany . | |
| 1452500 | 3/1969 | Fed. Rep. of Germany | 228/158 |
| 1120868 | 7/1956 | France . | |
| 1120911 | 7/1956 | France . | |
| 51-059748 | 5/1976 | Japan . | |
| 479600 | 11/1975 | U.S.S.R. | 228/5.7 |

Primary Examiner—M. Jordan
Assistant Examiner—Carmine Cuda
Attorney, Agent, or Firm—Antonelli, Terry & Wands

[57] ABSTRACT

A continuous steel hot-rolling method and apparatus for successively bonding a plurality of steel pieces of a predetermined length and maintained at a high temperature so as to form a continuous train of the steel pieces for roll by a rolling mill. The apparatus includes a holding device for holding a trailing end of a preceding steel piece and a leading end of a succeeding steel piece. A device is provided for shearing the ends of the steel pieces while the ends are held by the holding device. A device heats the sheared trailing end of the preceding steel piece and the sheared leading end of the succeeding steel piece to a predetermined temperature, with a device being provided for driving at least one of the preceding and following steel pieces along a travel path of the steel pieces to press and bond the heated trailing end surface of the preceding steel piece and the heated leading end surface of the succeeding steel piece. A carrier carries all the above devices and is disposed upstream of the rolling mill for movement along the travel path of the steel pieces being bonded.

3 Claims, 9 Drawing Figures

METHOD OF CONTINUOUSLY HOT-ROLLING STEEL PIECES

BACKGROUND OF THE INVENTION

The present invention relates to hot-rolling of steel pieces such as, for example, slabs, blooms, billets, and semifinished steel bars, and, more particularly, to a method and an apparatus suitable for use in continuous hot-rolling of steel pieces.

A conventional hot-rolling line includes roughing rolls and finishing rolls through which a hot slab from a heating furnace is progressively rolled and formed into a coiled strip of a desired thhickness. A disadvantage of this conventional hot-rolling line resides in the fact that there is a low efficiency of rolling work since the slabs are discontinuously rolled.

To avoid this disadvantage, Japanese Patent Laid-Open Publication No. 22500/1980 discloses a continuous rolling method in which a plurality of slabs of a predetermined length, produced by a continuous casting apparatus, pass through a stationary bonding apparatus which is operative to bond the trailing end of a preceding slab to the leading end of a succeeding slab to form a continuous web which is then continuously rolled through a hot-rolling line.

However, the continuous rolling method proposed in the above mentioned Japanese Publication can not be applied to a practical hot-rolling mill due to the following reasons since the slab entering the hot-rolling mill has a thickness of about 200 mm, with a thickness of the slab being as large as 30 to 60 mm at an inlet side of the finishing rolls. Consequently, it is impossible to bond the opposing ends of such thick slabs by a stationary bonding apparatus.

More particularly, the yield from the continuous casting equipment per strand is equal to approximately ¼ to ⅓ of the yield from the hot-rolling mill, so that it is necessary to successively feed three to four strands of slabs into the hot-rolling mill. In an actual hot-rolling mill, a plurality of slabs cut in a suitable length are successively fed into the hot-rolling mill in a short period of time however, generally, the rolling of a one piece of slab can be finished in a short time period of about one minute at the longest. Therefore, in order to bond the opposing leading and trailing ends of successive slabs in such a short period of time, it is required that the bonding operation be conducted while the slabs are being moved, which requirement cannot be met by a stationary type bonding apparatus.

While pressure welding represents one possible practical method for bonding successive hot slabs, a disadvantage of pressure welding of slabs by merely pressing the opposing ends of slabs resides in the fact that the operational steps require a long time due to conditions such as the cross-sectional shape, scales and the like.

Japanese Patent Laid-Open Publication No. 59748/1976 proposes another hot-rolling method, wherein the lengthwise leading and trailing ends of each of the successive slabs are sheared in the widthwise direction such that each sheared surface makes a predetermined angle (20° to 85°) to the slab surface. The sheared surfaces are then descaled, and the descaled adjacent ends of successive slabs are then pressed together while the slabs are rolled, whereby the slabs are bonded into a long continuous web. One disadvantage of this known method resides in the fact that it is essential that the shearing of the slab ends is made precisely at a predetermined angle of 20° to 85°, which precision shearing is quite difficult to attain during a rolling operation. Consequently the shearing has to be conducted in an off-line operation at the inlet side of a heating furnace. Thus, the shearing of the ends of a running slab with such a high precision of shearing surface angle is extremely difficult to perform. Moreover, according to this method, successive slabs are fed into rolls so that the adjacent ends of the slabs are pressed against each other so that it is difficult to precisely determine factors, such as pressing force and reduction ratio, which are required to precisely bond slabs.

Accordingly, an object of the present invention is to provide a continuous steel hot-rolling method and apparatus which permit bonding of hot steel pieces in a short period of time thereby affording a continuous hot rolling of steel slabs.

According to advantageous features of the invention, a method of continuously hot-rolling steel pieces is proposed which includes the steps of bringing a trailing end of a preceding hot steel piece and a leading end of a hot succeeding steel piece in close proximity to each other while the steel pieces are traveling on an upstream side of the rolling mill, shearing the trailing end portion of the preceding steel piece and the leading end portion of the succeeding steel piece while they are held in close proximity to each other, heating the trailing end of the preceding steel piece and the leading end of the succeeding steel piece to a desired temperature immediately after the shearing, pressing the heated leading end surface of the succeeding steel piece to the heated trailing end surface of the preceding steel piece to bond the steel pieces to form a continuous train of steel pieces, and leading the continuous train of the steel pieces into the rolling mill to thereby enable a continuous rolling of the steel pieces.

According to another feature of the invention, an apparatus for continuously hot-rolling steel pieces is provided which includes steel piece holding means for holding a trailing end of a preceding steel piece and a leading end of a succeeding steel piece during a transporting of the steel pieces, with means for shearing the ends of the steel pieces while the ends are held by the steel piece holding means. Means are provided for heating the sheared trailing end of the preceding steel piece and a sheared leading end of the succeeding steel piece up to a predetermined temperature. Means are also provided for driving at least one of the preceding and following steel pieces in a direction parallel to the path of travel of the steel pieces to press and bond the heated trailing end surface of the preceding steel piece and the heated leading end surface of the succeeding steel piece together. A carrier is disposed on an upstream side of the rolling mill and carries or supports the holding means, shearing means, heating means, and pressing means, with the carrier being movable along a path of travel of the steel pieces.

DETAILED DESCRIPTION

Figure 1:
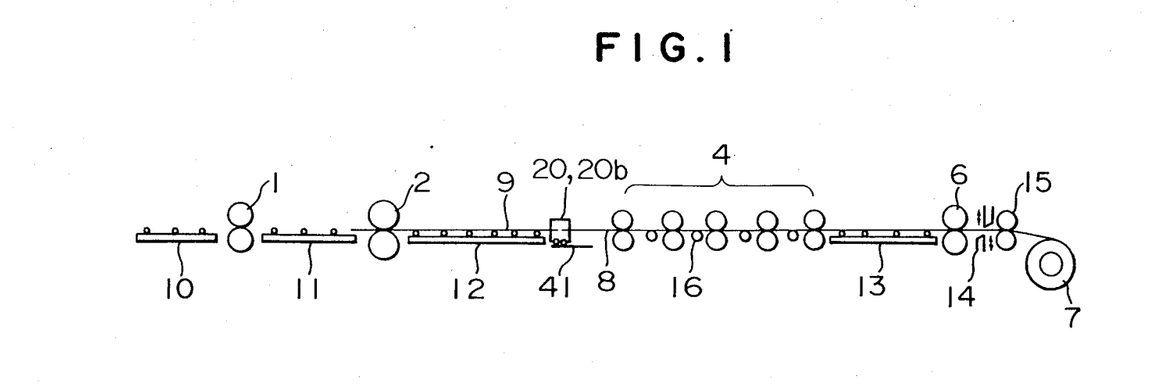
FIG. 1 is a schematic illustration of an embodiment of a continuous steel hot-rolling apparatus in accordance with the invention.

Referring now to the drawings, wherein like reference numerals are used throughout the various views to designate like parts and, more particularly, to FIG. 1, according to this figure, a continuous steel hot-rolling apparatus of the invention includes first and second roughing mills 1 and 2 through which a slab, corresponding to one strand of material supplied from a continuous casting apparatus (not shown), is rolled roughly in the hot state. A series of finishing mills 4 are provided along with a looper 16 disposed in the series of finishing mills 4, pinch rollers 6, 15 disposed at the inlet side of a down coiler 7, and a flying shear 14 for shearing the strip. Roller tables 10, 11, 12, 13 are provided along which the slab and the strip run. The series of finishing mills 4 usually has five to seven mills and the strip is rolled simultaneously through all finishing mills. A bonding device 20 is operative to bond a preceding slab 8 and a succeeding slab 9 while they are running, with the bonding device 20 being capable of moving a predetermined distance along the path of travel of the slabs.

The heat of the slabs, heated to a temperature of, for example 1000° to 1100° C., can suitably be used in bonding the hot slabs to each other; however, the bonding of moving slabs for continuous rolling, has a number of requirements.

More particularly, in order to minimize the distance of movement of the bonding device, it is necessary that the bonding of the travelling slabs be accomplished in a short period of time of, for example, twenty seconds, and the bonding should ensure a bonding strength so as to prevent separation of the bonded slabs from each other during the subsequent finish rolling by the finishing mill.

Unfortunately, however, a mere press bonding by use of only the heat possessed by the hot slabs cannot completely meet the above-noted requirements. Namely, since the slabs to be hot-rolled have a temperature of 1000° to 1100° C. at the bonding station, these slabs possess a considerably large quantity of heat. If the slabs can be press-bonded or pressure-welded solely by this heat, no additional supply of energy will be needed.

From this point of view, it has been experimentally determined by using a miniaturized model of a slab having a thickness of 9 mm and a width of 60 mm that slabs could not be satisfactorily bonded solely by the heat originally possessed by the slabs and with the bonding pressure of up to 3 Kg/cm². It would be possible to increase the pressing force to a level of 5 to 10 Kg/cm²; however, if such a large pressing force is to be applied to the actual slab which is typically 50 mm thick, 1500 mm wide and 50 to 80 m long, the necessary pressing load will amount to $(50 \times 1500) \times (5$ to $10)$ tons—375 to 750 tons. In order to exert such a large force, the bonding device must be of an impractically large size. Additionally, such a large force would result in an undesirable bending of the hot slab to be bent, and it is almost impossible to drive such a large-sized bonding device along the path of travel of the slab.

Figure 6:
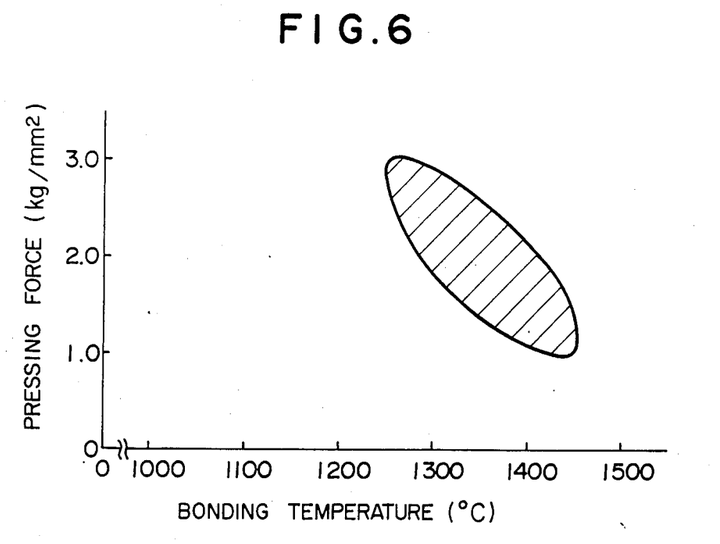
FIG. 6 is a graphical illustration of an adequate range of the temperature to which the ends of steel pieces to be bonded are heated and the pressing force required for the bonding.

Based upon the results of the above experiments, it has been determined that the ends of the travelling slabs can be satisfactorily bonded to each other by using a bonding device having a heating means capable of heating the ends of slabs in a short period of time and a pressing device by which the slab ends are pressed to each other. Various other experiments using slab models explained before or conducted confirming the fact that a good bonding can be attained when the heating temperature and the pressing force fall within the hatched area of the diagram shown in FIG. 6. Namely, for attaining a good bonding of slabs, the temperature of the slab ends should range from 1250° to 1450° C. As can be appreciated, the lower the temperature, the greater the pressing force should be. In other words, the bonding can be performed with a smaller pressing force if the slab ends are heated to a higher temperature. In any event, in order for the slabs to be bonded to each other, it is necessary that the slabs are heated nearly to the melting point of the material of the slabs and then pressed to each other with a suitable pressing force.

Various heating means are conceivable as the heating means for use in the bonding device and, for example the heating means may be a high-frequency induction heating means. It has been determined that, by adequately selecting the capacity of the high-frequency power source, it is possible to heat the ends of the hot slabs (1000° to 1100° C.) up to the temperature suitable for the bonding, i.e., from 1250° to 1450° C., in quite a short time period of from five to twenty seconds.

It is possible to achieve three types of bonding, namely, a perfect bonding, i.e., bonding over the entire slab end surfaces; a bonding only at the peripheral parts of the slab end; and a bonding only at the central portions of the slab end surfaces.

The perfect bonding is preferable in order to attain a good bonding which is strong enough to prevent separation of slabs in the finishing rolling step. This, however, uneconomically requires a large consumption of electric power as well as a long heating time. As to the peripheral bonding, an experiment conducted with an actual slab 100 mm thick and 1400 mm wide showed that, wih a small peripheral bonding ratio (welding ratio) of 30%, the slabs could be rolled without separation of the slabs or the final sheet bar. The bonding at central portions is not preferred because of a large possibility of separation of slabs during hot-rolling due to the surface notch effect.

Thus, from the view point of economy and time, the peripheral bonding is most preferred. Obviously, this way of bonding can be conveniently conducted by high-frequency induction heating which is best suited to the heating of only the peripheral parts of slabs. In fact, this heating method makes it possible to bond steel slabs within a short time period of from five to twenty seconds even in the atmosphere, thus contributing to the improvement in the efficiency and economy in the continuous hot-rolling of steel slabs.

As another practical means for bonding hot slab ends, the invention also proposes a bonding device which utilizes a metallic material having a melting point lower than the slab material and adapted to be placed or interposed between the end surfaces of the slabs to be bonded. With the low melting point material interposed between the slab end surfaces, the end portions of the slabs are heated either by applying an electric voltage across the slab ends to concentrically heat the interface or by other methods, whereby the low melting point metal is molten. Simultaneously the slab ends are urged or pressed together to expel the unnecessary liquid phase metal by the pressure developed to thereby weld the slab end surfaces. Thus, this bonding device includes a heating means, means for placing the low melting point metal and means for pressing the slabs one against the other, with the bonding device being operable to bond slabs in a short period of time, e.g., several seconds, even in the atmospheric air. Furthermore, this bonding device can be used to bond slabs of different materials.

Figure 3:
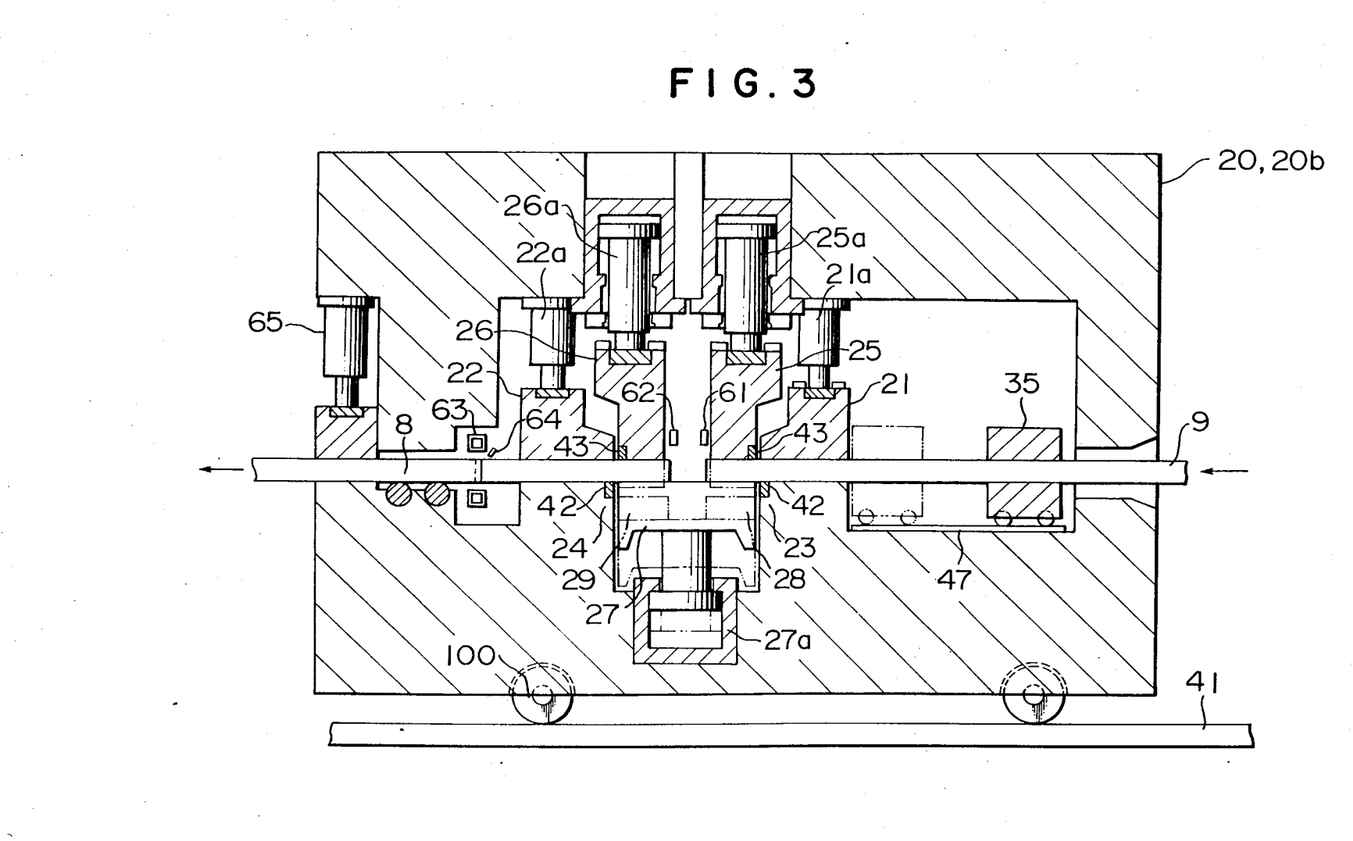
FIG. 3 is a sectional view of a mobile steel piece bonding device incorporated in the continuous steel hot-rolling apparatus shown in FIG. 1 or 2.
Figure 4:
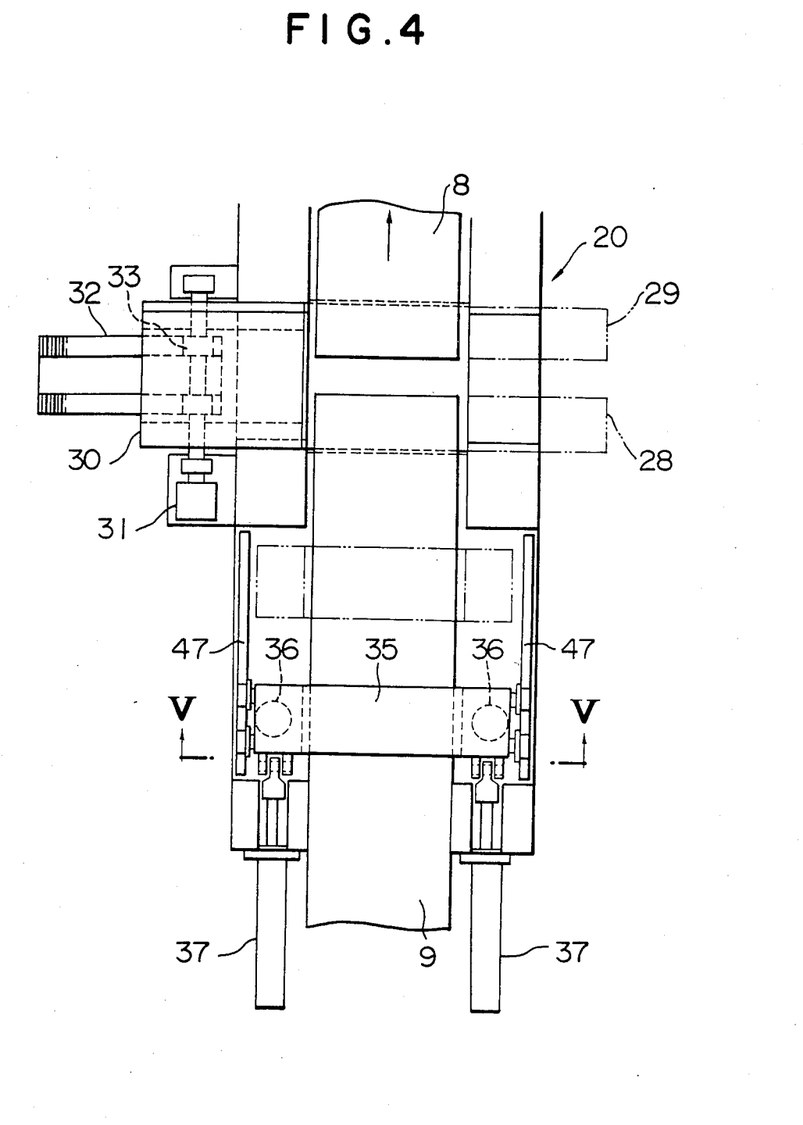
FIG. 4 is a fragmentary plan view of the bonding device shown in FIG. 3.

An example of the bonding device incorporating the aforementioned high-frequency induction heating means, suitable for use in the continuous hot-rolling apparatus of the invention, is shown in FIGS. 3 and 4.

Referring first to FIG. 3, a mobile bonding device 20 in the form of a carrier which has wheels 100 adapted to roll on rails 41 disposed along the path of travel of slabs to be rolled so that the bonding device 20 is capable of moving in synchronism with the travel of slabs. The bonding device 20 has a pair of strip holding devices 22, 21 which are respectively adapted to hold the trailing end portion of a preceding slab 8 and the leading end of a succeeding slab 9. The holding devices 22, 21 are, respectively, adapted to operate, respectively, in response to output signals from detectors 62, 61 which detect the trailing end of the preceding slab 8 and the leading end of the succeeding slab 9. On receipt of the output signals, hydraulic cylinders 22a, 21a in the holding devices are actuated to clamp and fix the ends of the slabs 8, 9.

A shearing device is disposed between both holding devices 21 and 22, with the shearing device including a pair of lower cutter holders 23, 24, both having shearing cutters 42, and a pair of upper cutter holders 25, 26, both having shearing cutters 43. The upper cutter holders 25, 26 are adapted to be driven downwardly by the operation of hydraulic cylinders 25a, 26a so as to vertically shear the trailing end of the preceding slab 8 and the leading end of the succeeding slab 9 to sever predetermined lengths of the slab ends. In order to ensure a smooth shearing operation, an anvil 27 is disposed beneath the upper cutter holders 25, 26 and below the slabs 8, 9. The anvil 27 is supported by a hydraulic cylinder 27a which operates to lower the anvil 27 in synchronism with the lowering of the upper cutter holders 25, 26 so that the anvil 27 supports the slab ends to impart a predetermined force to the slab ends while the anvil 27 is lowered.

As shown in FIG. 4, a crop pusher device 30 is disposed between the lower cutter holders 23, 24. The crop pusher device 30 includes a motor 31, a rack 32 and a pinion 33 engaged therewith so that the pinion 33 is rotated by the motor to drive the rack 32 and a pusher member of the crop pusher device 30 in the direction perpendicular to the direction of travel of the slabs, whereby the severed ends, i.e., crops, are pushed by the crop pusher device 30 laterally away from the path of travel of the slabs to assure that the crops do not impede the succeeding bonding operation.

After the shearing of the ends of the slabs 8, 9 by the shearing device and after the removal of the crops by the crop pusher device 30, the slabs 8, 9 are moved to a position in which the trailing end of the preceding slab 8 and the leading end of the succeeding slab 9 come to the region of a high-frequency heating device 63 which is, in the embodiment of FIGS. 3, 4, a high-frequency induction heating device. Then, the heating device 63 heats up the slab ends to a predetermined temperature of from 1250° to 1450° C. as mentioned. When the temperature of the slab ends rises to the above-mentioned temperature as sensed by a temperature sensor 64, a clamp cylinder 65 is actuated to clamp the preceding slab 8 and, thereafter, a pressing device 35 operates to press the succeeding slab 9 against the preceding slab 8. The pressing device 35 includes upper and lower pressing plates 51, 52 for clamping the slab 9 from the upper and lower sides thereof, hydraulic cylinders 36 for adjusting the clearance between these pressing plates 51, 52, hydraulic cylinders 37 operable in the direction of movement of the slabs to urge the leading end surface of the succeeding slab 9 against the trailing end surface of the preceding slab 8, and rails 47 along which the pressing device 35 as a whole is moved in response to the operation of the hydraulic cylinders 37.

A description will be made hereinunder as to the operation of the mobile bonding device 30 used to bond steel pieces which formed as steel strips having a thickness of 60 mm.

Referring to FIG. 3, the bonding device 20 is moved along the rails 41 at a speed of 30 m/min to follow-up the travelling strips so as to locate the trailing end of the preceding strip 8 and the leading end of the succeeding strip 9 to the shearing position. Then, the hydraulic cylinders 21a, 22a are operated to clamp the ends of the strips 8, 9 by the strip holding devices 21, 22, with the clamping operation taking about four seconds. Then, the shearing device including the lower cutter holders 23, 24 and the upper cutter holders 25, 26 is actuated to shear the trailing end of the preceding strip 8 and the leading end of the succeeding strip 9 simultaneously or within quite a short time lag to precisely form sheared end surfaces on both strips 8, 9, with the shearing operation taking about four seconds. The shearing is conducted by cooperation of the lower cutter holders 23, 24 and the upper cutter holders 25, 26 which are driven downwardly by the hydraulic cylinders 25a, 26a. During the shearing operation, a predetermined supporting force is applied to the strips by the anvil 27 which is actuated by the hydraulic cylinder 27a downwardly in synchronism with the operation of the hydraulic cylinders 25a, 26a so that the ends of the strips 8, 9 to be sheared are clamped by the upper cutter holders 25, 26 and the anvil 27.

As a result of the shearing which takes about four seconds, crops 28, 29 are severed from the ends of the strips 8, 9 as indicated by two-dot-and dash lines. The crops 28, 29 are then pushed horizontally and laterally, i.e., in the direction perpendicular to the direction of travel of the strips 8, 9, away from the path of the strips 8, 9 by the operation of the crop pusher device 30 which includes the motor 31, the rack 32 and the pinion 33.

Then, the strip holding device 22 releases the preceding strip 8 and the running speed of the bonding device 20 is controlled so as to bring the trailing end of the preceding strip 8 to the region under the influence of the high-frequency heating device 63. Subsequently, the strip holding device 21 releases the following strip 9 and, with the pressing plates 51 and 52 of the pressing device 35 clamping the strip 9 therebetween, the hydraulic cylinder 37 of the pressing device 35 is operated to forwardly drive the succeeding strip 9 until the sheared end surface of the strip 9 is brought either into slight contact with the sheared end surface of the preceding strip 8 in the region of the high-frequency heating device 63 or to a position slightly spaced from the trailing end of the preceding strip 8. Then, the high-frequency heating device 63 is energized so that the trailing end of the preceding strip 8 and the leading end of the succeeding strip 9 are heated to a temperature of from 1250° to 1450° C. Then, the preceding strip 8 is clamped by the clamp 65 and the hydraulic cylinder 37 is further operated to press the leading end surface of the succeeding strip 9 against the trailing end surface of the preceding strip 8 for thereby welding and bonding these strips 8 and 9 to each other. The welding itself can be completed in a short time period of 0.5 to 1 second, but this bonding operation including the heating requires a time length of 5 to 20 seconds in total. The pressing force is preferably not greater than 3 Kg/cm². After the bonding of the strips 8, 9, the bonded strips are unclamped, with the unclamping operation being completed in two seconds.

The bonding operation, however, involves other miscellaneous works. For instance, in the case where the high-frequency heating device 63 is of the type which supplies high-frequency current directly to the strips, it is necessary to move electrodes or terminals into and out of contact with the strips at a suitable timing. In addition, it is necessary to trim the sheared end surfaces of the strips. The trimming takes about 5 seconds.

Figure 7:
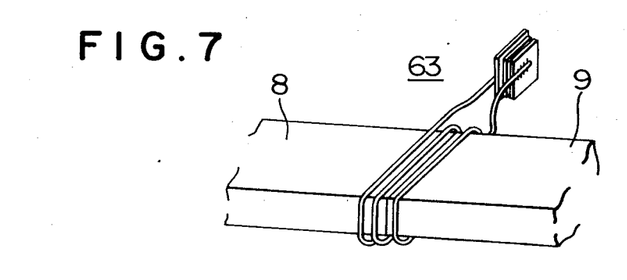
FIG. 7 is a perspective schematic illustration of a high-frequency heating means incorporated in the bonding device shown in FIG. 3.

The high-frequency heating device 63 used in the described embodiment is schematically shown in FIG. 7.

After the unclamping of the bonded strips 8 and 9, the bonding device 20 is moved backwardly to the starting position at a speed of 90 m/min to prepare for the next bonding operation.

Thus, the bonding of the strips of 60 mm thick can be completed in a short time which is given as the sum of the time periods required for the respective steps of operation; namely, (i) four seconds for holding of two strips, (ii) four seconds for shearing of strip ends, (iii) five to twenty seconds for welding including heating and pressing, (iv) 2 seconds for unclamping and (v) 5 seconds for miscellaneous steps. The total is from 20 to 35 seconds.

Considering the fact that the running speed of the preceding strip 8 of 60 mm thick is 30 m/min, the bonding device 20 requires a stroking space of 10 to 17.5 m long in order to carry out the above-described bonding operation. Thus, the bonding device 20 completes each bonding operation within a time period while the device 20 travels a distance of 17.5 m at the maximum at the same speed as the strip, i.e., 30 m/min. Thereafter, the device 20 is moved backward at a high speed of 90 m/min to the starting position to prepare for the next bonding operation.

The continuous web formed by the bonded strips is introduced into the finishing mills 4 and continuously rolled into the final size, as will be seen in FIG. 1.

Figure 2:
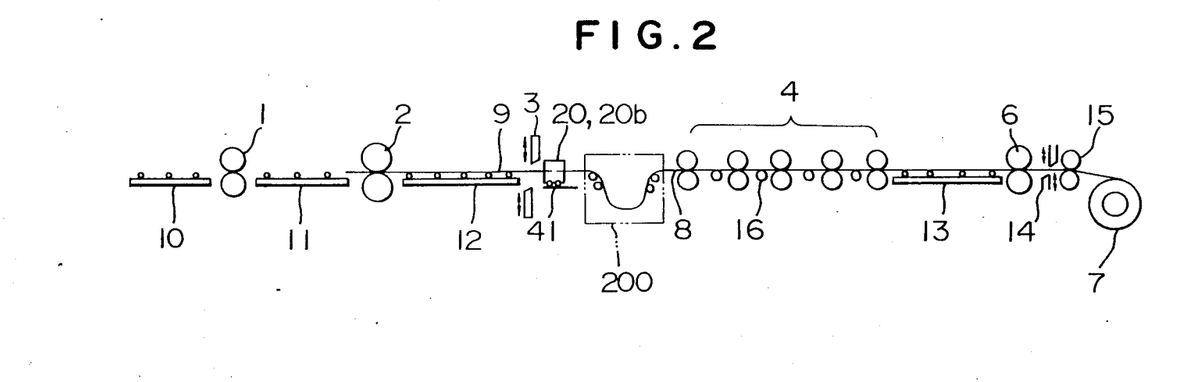
FIG. 2 is a schematic illustration of another embodiment of the continous steel hot-rolling apparatus in accordance with the invention.
Figure 8:
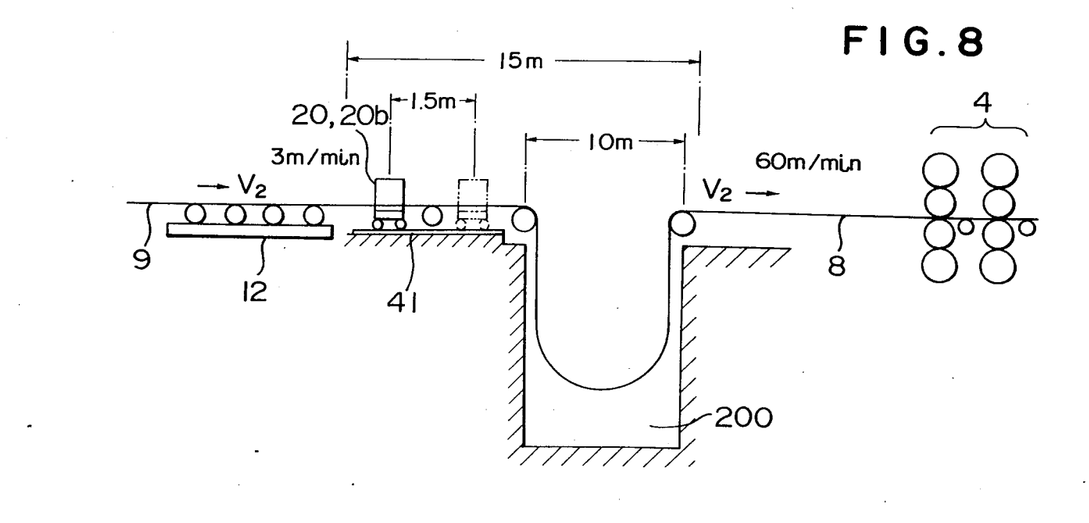
FIG. 8 is a schematic illustration of a looping pit used for the continuous hot-rolling apparatus shown in FIG. 2.

FIG. 2 shows another embodiment of the continuous steel hot-rolling apparatus of the invention, which is suitable for use in the case where the steel strip is relatively thin (for example, thickness of 30 mm) and has a length of from 50 to 80 m. In this embodiment, in order to reduce the stroke or running distance of the bonding device 20, a looping device 200 capable of storing a predetermined length of the preceding strip 8 is disposed at the inlet side of the finishing mills 4. Since the thin strip has a high flexibility, the looping device 200 may be in the form of a looping pit as shown in FIG. 8. By using such a looping pit, the dimension of the looping device 200 in the strip running direction may be reduced to 10 m or so, although the looping pit 200 should be large enough to accomodate about 35 m of the strip 8. It will be seen that, because the length of the strip stored in the looping device 200 can be increased by increasing the depth of the looping pit 200, the running speed and distance of the carrier 20 can be decreased correspondingly. Namely, in this embodiment, the bonding device 20 is allowed to run at a very low speed (for example, about 3 m/min) which is not equal to the high speed of, for example, 60 m/min at which the preceding strip 8 is drawn into the finishing mills 4. Although the amount or length of the preceding strip 8 stored in the looping device 200 is progressively decreased due to the difference between the speed at which the strip 8 is drawn into the finishing mills 4 and the speed at which the bonding device 20 is moved, no problem occurs if the bonding operation, which is finished in twenty to thirty-five seconds as explained before, is completed before the stock of the strip 8 in the looping device 200 is consumed. Namely, since the preceding strip 8 drawn by the finishing rolls at the speed of 60 m/min runs a distance of 35 m at the maximum until one bonding step is completed within the maximum time period of thirty-five seconds, the looping pit 200 may be designed to store a length of 35 m of the preceding strip 8.

The following fact is to be noted in connection with the running speed and distance of the carrier 20. If the succeeding strip 9 at a high temperature is held stationarily on the roller table 12, the strip 9 will be locally cooled at the points of contact with the rollers of the roller table 12 with a resultant undesirable formation of skid marks in the locally cooled portions of the strip. To avoid this problem, it is preferred that the bonding device 20 runs a distance corresponding to the pitch of the rollers of the roller table 12, e.g., 1.5 m within each bonding time period of twenty to thirty-five seconds. According to such an arrangement, it is possible to decrease the distance to be travelled by the bonding device 20 and, to prevent undesirable local cooling of the strip 9. Consequently, the overall length required for the bonding operation can be decreased to about 15 m.

Another advantage of the embodiment shown in FIG. 2 is that the construction of the bonding device 20 can be simplified because it is not necessary to mount the strip shearing device on the bonding device 20. Namely, in this embodiment, the shearing device is disposed between the downstream end of the roller table 12 and the upstream end of the bonding device as viewed in the travel or transport direction of the strips.

A modified device 20b employs, in place of the high-frequency heating device used in the first embodiment, a metal of a low melting point placed between the trailing end of the preceding strip and the leading end of the succeeding strip. It will be clear to those skilled in the art that the arrangement of the continuous hot-rolling apparatus need not be changed except for a substitution of the modified bonding device 20b for the bonding device 20 described before in connection with FIGS. 1 and 2.

Figure 9:
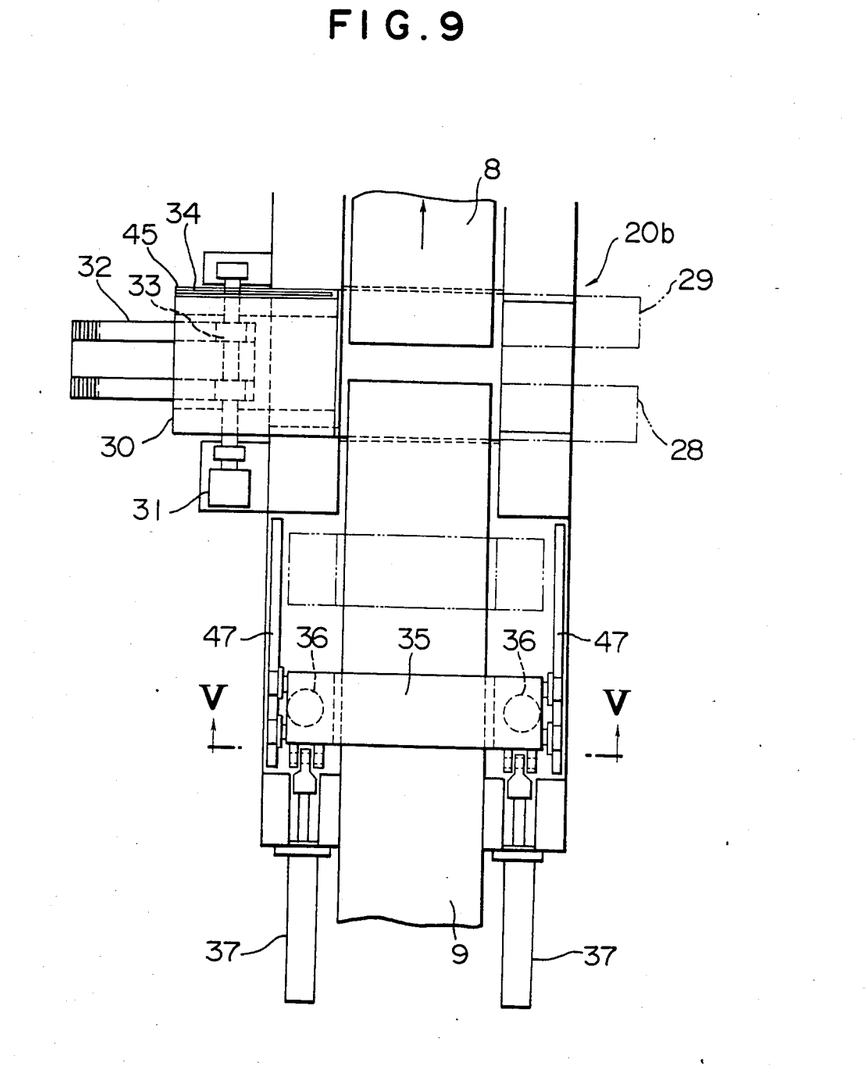
FIG. 9 is a fragmentary plan view of a modification of the mobile steel piece bonding device incorporated in the continuous hot-rolling apparatus shown in FIG. 1 or 2.

The basic arrangement of the bonding device 20b is, as shown in FIG. 9, substantially identical to that of the device 20 explained before, so that the following description will be directed only to the points of difference.

The bonding device 20b shown in FIG. 9 has a crop pusher device 30 disposed between the lower cutter holders 23, 24 as in the case of the bonding device shown in FIG. 4. The crop pusher 30 is operable in the horizontal direction perpendicular to the direction of travel of the strips, by the motor 31 transmitted through the rack 32 and the pinion 33 as in the case of the crop pusher device of the first embodiment. In the bonding device 20b shown in FIG. 9, however, the crop pushing device 30 has an additional mechanism 45 for feeding a low melting point metal 34 into the gap between the steel strips 8 and 9.

Figure 5:
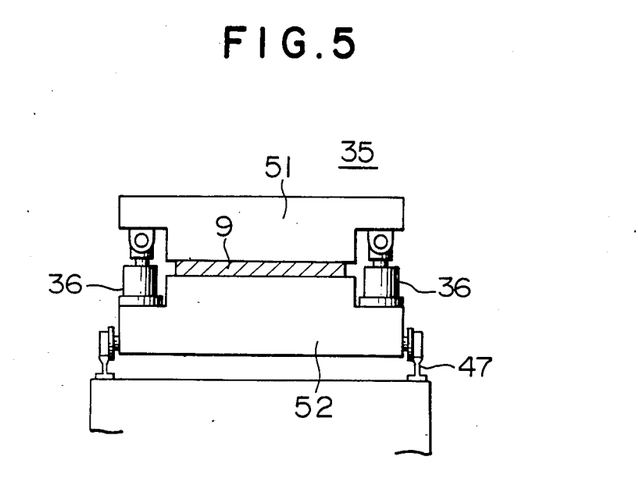
FIG. 5 is a sectional view taken along the line V—V in FIG. 3.

In operation, after the shearing of the ends of the steel strips 8, 9 and after the removal of the crops by the crop pusher device 30, the low melting point metal 34 is inserted by the mechanism 45 into the gap between the sheared surfaces of both strips 8, 9. Then the pressing device 35 is operated in the same manner as explained before in connection with FIGS. 4 and 5 to drive the succeeding strip 9 forwardly to press the leading end surface thereof against the trailing end surface of the preceding strip 8 to bond these strips with the intermediary of the low melting point metal 34.

The low melting point metal may be in the form of foil, powder or granules and have a melting point of, for example, 1000° C. which is lower than the temperature of the strips. The low melting point metal is interposed between the vertically sheared end surfaces of both strips and then the leading end surface of the succeeding strip is pressed against the trailing end surface of the preceding strip while the strips, having a temperature of 1000° to 1100° C., are further heated, so that the low melting point metal is melted and, at the same time, the adjoining surfaces are concentrically heated to a desired temperature by a suitable heating device, which may be a high-frequency induction heating device, to locally melt the adjoining surfaces while expelling unnecessary liquid phase metal by the pressure developed on the adjoining surfaces. Any impurities such as scales on the adjoining surfaces are expelled simultaneously with the removal of the unnecessary liquid phase metal, so that both strips are welded and bonded with a sufficiently high bonding strength.

When the strips to be bonded are of a low-carbon steel or an SUS steel, a Ni-based alloy or an alloy formed by adding a low-melting point alloy element to the material of the strip is used suitably as the low melting point metal.

The pressing force should be selected to be large enough to ensure a sufficient bonding strength to avoid any separation of the strips during the rolling, although a small pressing force is preferred from the view point of minimization of the bead or protrusion which may be formed on the strip material at the juncture between the two bonded strips. An experiment showed that a bonding strength equivalent to that of the original strip material can be obtained with a surface pressure of from 5 to 10 $Kg/cm^2$. However, considering that the strips are scheduled to be separated again after the finishing rolling, the bonding operation may be effected with surface pressure of less than 5 to 10 $Kg/cm^2$.

Assuming here that the bonding surface pressure is from 0.1 to 5 $Kg/cm^2$, the pressing force required for pressing the slab of 30 mm thick and 1500 mm wide is calculated to be in a range of from 4500 to 225,000 Kg.

According to this method, it is possible to attain a sufficiently high bonding strength approximating the strength of the steel strip material itself within a short period of several seconds and in the atmospheric air.

As shown in FIG. 9, after the shearing of the trailing end of the preceding strip 8 and the leading end of the succeeding strip 9, the crops 28, 29 severed from the strips are pushed laterally away from the path of the travel of the strips and the low melting point metal 34 is put by the mechanism 45 into the gap between the strips 8, 9. Immediately after the placement of the solder 34, the ends of the strips 8, 9 are heated by the high-frequency heating device 63 to a desired temperature and, after slightly loosening the strip holding device 21, the hydraulic cylinder 37 of the pressing device 35 is actuated to feed the succeeding strip 9 forwardly to press the leading end surface of the strip 9 against the trailing end of the preceding strip 8 to thereby weld and bond the two strips 8, 9.

After the strips have been bonded, the strip holding device 22 and the pressing device 35 release the strips and the bonding device 20b is returned to the starting position thus completing one cycle of the bonding operation.

The continuous web formed by the bonded strips is then introduced into the finishing mills 4 of the continuous rolling apparatus as shown in FIG. 1 or 2 so as to be rolled into the final size.

As will be understood from the following description, according to the invention, it is possible to bond successive steel pieces in a short period of time, so that it becomes possible to conduct a highly efficient continuous steel hot-rolling operation.

What is claimed is:

1. A continuous steel hot-rolling method in which flexible hot steel pieces of a thickness of between 30–60 mm, a predetermined length, and maintained at a high temperature, are successively bonded in series to form a continuous train of hot steel pieces for a continuous rolling by a rolling mill, the method comprising the steps of:

bringing the trailing end of a preceding hot steel piece and the leading end of a succeeding hot steel piece in close proximity to each other while said hot steel pieces are at a temperature of from 1,000° C. to 1,100° C. and travelling on the upstream side of said rolling mill;

shearing the trailing end portion of said preceding hot steel piece and the leading end portion of said succeeding hot steel piece while they are held in close proximity to each other;

immediately after shearing, heating the trailing end of said preceding hot steel piece and the leading end of said succeeding hot steel piece by a high frequency heating means to a desired temperature of 1,250° C. to 1,450° C. while said hot steel pieces are travelling;

pressing the heated leading end surface of said succeeding hot steel piece against the heated trailing end surface of said preceding hot steel piece to bond said hot steel pieces within about 20–35 seconds while said hot steel pieces are travelling to thereby form a continuous train of the hot steel pieces;

said heating and pressing being conducted at a heating temperature and a pressing force in a range determined in dependence upon the material of the hot steel pieces to be bonded;

storing a predetermined length of said preceding hot steel piece on an upstream side of said rolling mill to absorb a difference between a speed at which said preceding hot steel piece is introduced into said rolling mill and a speed at which said hot steel piece end surfaces are moved during bonding thereof; and leading said continuous train of hot steel pieces into said rolling mill thereby continuously rolling said hot steel pieces.

2. A continuous steel hot-rolling method according to claim 1, further including the step of, prior to said pressing step, placing a metal of a melting point below the melting point of said hot steel pieces between the sheared trailing end surface of said preceding hot steel piece and the sheared leading end surface of said succeeding hot steel piece.

3. A continous steel hot-rolling method according to claim 1, wherein said shearing step is conducted while said hot steel pieces are travelling.

* * * * *